United States Patent [19]

Ashtheimer et al.

[11] 4,298,577
[45] Nov. 3, 1981

[54] PROCESS FOR RECOVERY OF URANIUM FROM SEA WATER

[75] Inventors: Ludwig Ashtheimer, Jülich; Hans-Joachim Schenk, Aachen; Klaus Schwochau, Jülich, all of Fed. Rep. of Germany

[73] Assignee: Kernforschungsanlage Jülich GmbH, Jülich, Fed. Rep. of Germany

[21] Appl. No.: 907,630

[22] Filed: May 19, 1978

[30] Foreign Application Priority Data

May 20, 1977 [DE] Fed. Rep. of Germany ....... 2722838

[51] Int. Cl.³ .............................................. C01G 43/00
[52] U.S. Cl. ....................................... 423/6; 252/628
[58] Field of Search ............... 423/6, 7; 252/301.1 W, 252/301.1 R

[56] References Cited

U.S. PATENT DOCUMENTS

| | | | |
|---|---|---|---|
| 3,000,696 | 9/1961 | Teichmann | 423/7 |
| 3,101,998 | 8/1963 | Milliken et al. | 423/6 |
| 3,725,291 | 4/1973 | Serbus et al. | 423/6 |
| 3,763,049 | 10/1973 | Gerber | 423/7 |
| 3,922,231 | 11/1975 | Carlin et al. | 423/6 |
| 4,039,445 | 8/1977 | Heide et al. | 423/6 |

OTHER PUBLICATIONS

*Nucl. Sci. Abs.*, 18, abs. #40967 (1964).
Cameron et al., *Chem. Abs.*, 85, abs. #195100t, (1976).
Wilhelms, *Chem. Abs.*, 78, abs. #149604t (1973).
Bruce et al., "Progress in Nuclear Energy, Series III, Process Chemistry", vol. 7, pp. 13-20, Pergamon Press (1961) Oxford (TK9350 B7).
Winkler "Symp. Tech. Zagadnien Ochrory Promieniowaniem" (Warsaw), pp. 546-559, Zentrolinstitut für Kernphysik, Rossendorf, Germany (1962).
Cameron et al. "Extraction of Uranium from Aqueous Solutions by Coals of Different Rank and Petrographic Composition", G.S. Can-p.-74-35, 10 pp., Geol. Surv. Canada (1975) Ottawa.

*Primary Examiner*—Edward A. Miller
*Attorney, Agent, or Firm*—Frishauf, Holtz, Goodman & Woodward

[57] ABSTRACT

Granulated lignite (brown coal) is used to provide an adsorption matrix with which sea water is brought into contact long enough to reach a substantially maximum adsorption of uranium, after which the adsorption matrix is removed from the solution and is burned with utilization of its heating value while the heavy metals are concentrated in the combustion residue, after which the thus concentrated heavy metals are recovered in the form of their salts by previously known treatment. An average grain diameter of the granular lignite between 0.5 and 2 mm is used and about 3 mg of uranium per kg of dry lignite is adsorbed with a contact time in the region between one and sixty seconds. Uranium adsorption falls off when there is a substantially greater concentration of foreign ions, particularly calcium, magnesium and sulphate.

2 Claims, 1 Drawing Figure

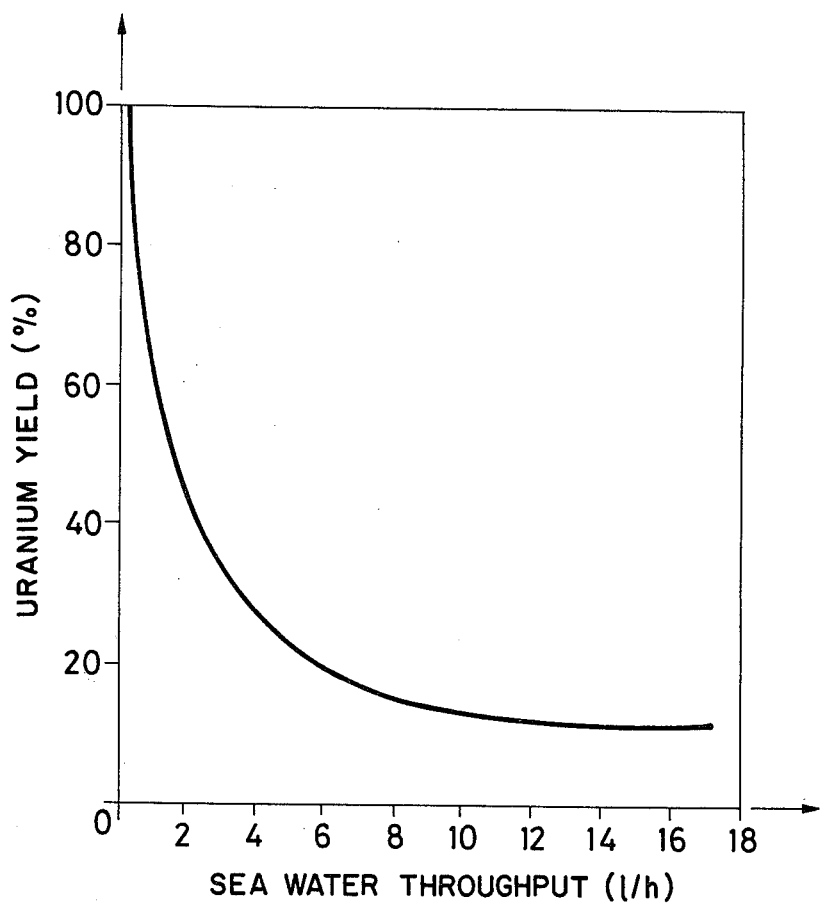

PROCESS FOR RECOVERY OF URANIUM FROM SEA WATER

This invention concerns a process for the recovery of uranium dissolved in sea water or in a solution of a composition comparable to that of sea water.

Since there is a practically unlimited supply of uranium in sea water, countless experiments have been undertaken to recover the uranium contained in sea water. So far as concerns the heretofore known processes for recovery of uranium on the principle of extraction in counter-current, involving chemical precipitation and ionic flotation in sea water, it is however required to utilize chemical materials. That has the disadvantage that in general large quantities of chemicals must be used with the further disadvantage that the costs for consumption of such materials is relatively large. Pollution of the environment by the chemicals used can be prevented only at great expense, if it can be prevented at all.

A process is indeed known from German Pat. No. 2 441 479, according to a matrix is to be used for concentration of uranium consisting of cultivatable mutants algae. Because no chemical materials need be used in this case, pollution of the sea water is not to be feared. In order to obtain a daily production of uranium that is adequate for an economical recovery of uranium according to this known process, however, immense cultures would be required in order to raise the necessary quantities of algae. That can be provided, however, only at very great expense.

It is an object of the present invention to provide a process for the recovery of uranium dissolved in sea water or in solutions comparable to sea water in terms of their composition, which can be carried out without exposing the environment to pollution by the use of chemicals. The process should be applicable to the recovery of uranium from sea water to such an extent as is required to provide a daily yield of uranium necessary to support a process economically.

SUMMARY OF THE INVENTION

Briefly, an adsorber-containing matrix consisting of granulated lignite (brown coal) is brought into contact with sea water or a similar uranium-containing solution, until so great a proportion as possible of the uranium of the solution is adsorbed on the adsorber matrix, after which the matrix is removed from the solution and is burned in a manner utilizing heat producing value, in the course of which the uranium is concentrated in the combustion residue and is isolated in a known way after its concentration in this fashion, preferably being recovered in the form of one of its salts.

The invention is based on the surprising discovery that in spite of the high content of foreign ions in sea water—about $10^7$-fold compared to the quantity of uranium present in the form of the complex ion $[UO_2(CO_3)_3]^{-4}$—and in spite of the very small uranium concentration of about 3.3 $\mu$g of uranium per kg of sea water, the uranium is in fact quantitatively adsorbable on granular lignite. It is actually known from German Pat. No. 2 206 445, that lignite is effective both as a cation and as an anion exchanger. The range of application of this agent up to now, however, relates merely to relatively concentrated uranium solutions of a small PH value in the range of 1 to 4 which contain no foreign ions. Of course the process according to the invention needs optimizing for the most economical process operation. For reasons of time saving or on the basis of given adsorption-kinetics, it can be advantageous not to leave the adsorption matrix in contact with the solution to reach the maximum enrichment of uranium, but rather to remove the matrix from the sea water or similar solution already before reaching the equilibrium and to replace it then by a fresh adsorption matrix. On the other hand, the adsorptive loading should be selected to be as high as possible in order not to raise the requirement of the amount of adsorber per weight unit of uranium. It is advantageous in this connection, however, that the cost of providing the granulated lignite is relatively low so that the adsorption material is available in sufficient quantity on a favorable cost conditions. The heat value of the lignite coal for the utilization of its heating capability by combustion is to be added, it being usable for example is a power station located at the site of the uranium recovery installation.

A particularly useful development of the process according to the invention is provided when the adsorption matrix consists of grains having an average diameter in the region between 0.5 and 2 mm, which is exposed to a flow of sea water long enough for the loading of the adsorption matrix by about 3 mg of uranium per kg of dry lignite, the adsorption matrix being so designed that the contact time between matrix and solution lies in the region of from 1 to 60 seconds. The contact time in this case is the time which is required for the flow of a volume of liquid through the adsorber bed corresponding to the volume of the adsorber bed after the installation of a flow-through adsorption bed. The location of the adsorption matrix is therefore appropriately to be provided at the place in the natural flow of sea water, so that uranium depletion of the sea water to any appreciable extent does not need to be taken into account.

ILLUSTRATIVE EXAMPLES

A pilot plant for recovery of about 1 kg of uranium per day could consist of an adsorption bed having a bed surface of 36 by 36 meters and a bed depth of 40 cm and thus a bed volume of 520 m$^3$. The adsorption bed surface then amounts to 1300 m$^2$. With a layer density of 0.5 g per cm$^3$ and an average grain size of the brown coal in the range between 0.5 and 2 mm, the adsorption bed requires about 260 metric tons of lignite, in which case this filling, with assumption of a 60% water content for raw granular lignite, is capable of adsorbing uranium in the amount of 0.32 kg.

For carrying out the process according to the invention in the above described pilot plant, the sea water is fed to the adsorption bed from above, so that for obtaining the anticipated daily production of uranium and with the assumption of 15% adsorption yield (see drawing) a sea water volume of about 2×10$^6$ m$^3$ is to be brought into contact with the adsorber. That can happen by the utilization of the tides or also by having the sea water pumped onto the adsorber bed. After about 7.7 hours the adsorber material is saturated with uranium, after which it is replaced with new adsorption material. The raw lignite loaded with a maximum amount of uranium is then burned and the uranium is isolated from the ashes. For the recovery of the anticipated daily production of uranium about 820 metric tons of raw lignite are necessary.

EXAMPLE 1

For a determination of the percentage adsorption yield of uranium in dependence upon the contact time for the static case, 25 g of raw lignite (one kg of raw lignite corresponds to about 0.4 kg dry brown coal) of a grain size less than 0.5 mm was intensively shaken with Helgoland seawater, the natural uranium content of which was raised for analytical reasons from its normal value of $3 \times 10^{-6}$ g per liter by the addition of $Na_4[UO_2(CO_3)_3]$ to $9 \times 10^{-6}$ g per liter. After a contact time of five minutes the lignite had already adsorbed $8.46 \times 10^{-6}$ g of uranium, which corresponds to a yield of 94%.

The composition of Helgoland sea water corresponds to the known composition of sea water of the oceans.

EXAMPLE 2 (Referring to the Drawing).

For determination of the percentage adsorption yield of uranium in dependence upon the contact time in the dynamic case, the process step of adsorption of uranium was performed with a series of sample solutions of the composition given in Example 1. In each case 10 l of solution were led over 25 g of granular raw lignite, which was located in a glass column of an inner diameter of 12.5 mm. The filling height of the lignite grains in the column amounted to about 400 mm.

For the measurement of the individual samples raw lignite of different average grain size in the region from 0.4 to 2.6 mm was used. Since the sample liquid was in each case poured onto the adsorption bed from above without pumping or sucking the liquid, different flow-through velocities were established, depending upon the grain size.

The uranium adsorption yield depending upon the solution throughput is reproduced in the diagram provided in the drawing. It can be seen therefrom that a quantitative adsorption of uranium is produced below a solution throughput of about 0.3 liters per hour, whereas above about 10 liters per hour the yield remains almost constant at about 12%.

EXAMPLE 3

For determination of the uranium adsorption yield in dependence upon additional content of foreign ions, the process step of uranium adsorption was carried out with a series of sample solutions in which additional foreign ions were added to the aqueous solution of $Na_4[UO_2(CO_3)_3]$ of the uranium concentration provided in example 1.

The sample solutions were fed to an adsorption bed of the design described in example 2. The average grain size of the lignite used was 1.2 mm, so that a solution throughput of 3 to 4 liters per hour was established.

In the following table the resulting values are given, together with the corresponding data regarding the additions of foreign ions in the individual sample solutions. It is evident therefrom that the taking up of uranium is reduced with increasing foreign ion content, so that the uranium adsorption yield is particularly reduced with the addition of calcium, magnesium and sulphate.

TABLE I

| Sample No. | Foreign Ion Addition | Conc. (g/l) | Uran. Ads. (μg) | Yield (%) |
|---|---|---|---|---|
| 1 | $Na^+$ | 0.060 | 69.3 | 77 |
|   | $HCO_3^-$ | 0.143 | | |
|   | $CO_3^{--}$ | 0.007 | | |
| 2 | $Na^+$ | 10.557 | 55.0 | 61 |
|   | $Cl^-$ | 16.203 | | |
| 3 | $Na^+$ | 10.557 | 50.0 | 56 |
|   | $Cl^-$ | 16.203 | | |
|   | $HCO_3^-$ | 0.143 | | |
|   | $CO_3^{--}$ | 0.007 | | |
| 4 | $Na^+$ | 10.557 | 31.4 | 33 |
|   | $Mg^{++}$ | 1.279 | | |
|   | $Cl^-$ | 19.928 | | |
|   | $HCO_3^-$ | 0.143 | | |
|   | $CO_3^{--}$ | 0.007 | | |
| 5 | $Na^+$ | 10.557 | 22.5 | 25 |
|   | $Ca^{++}$ | 0.414 | | |
|   | $Cl^-$ | 16.937 | | |
|   | $HCO_3^-$ | 0.143 | | |
|   | $CO_3^{--}$ | 0.007 | | |
| 6 | $Na^+$ | 11.853 | 22.5 | 25 |
|   | $Cl^-$ | 16.203 | | |
|   | $SO_4^{--}$ | 2.704 | | |
|   | $HCO_3^-$ | 0.143 | | |
|   | $CO_3^{--}$ | 0.007 | | |

EXAMPLE 4

For determination of uranium loading capacity of lignite one g of raw lignite of a grain size less than 0.5 mm was brought into contact with intensive shaking with increasing quantities of a solution of the composition given in Example 1 in portions of 40 ml each and the uranium adsorption in dependence upon uranium supply was measured. The loading capacity thus statically determined mounted to about 16 mg of uranium per kg of dry lignite.

EXAMPLE 5

The uranium loading capacity of lignite was also determined for the dynamic case, in which the sample solutions were brought into contact with the lignite by flowing through an adsorption bed. For this purpose an adsorption bed of the design given in Example 1 was used and raw lignite of average grain size of 1.2 mm (throughput: 3 to 4 liters per hour) was doused with 100 liters of a solution of the composition likewise given in Example 1.

According to the measured values given in Example 2 (see drawing) a 30% adsorption yield of uranium is to be obtained, amounting to $270 \times 10^{-6}$ g. Since, however, only $120 \times 10^{-6}$ g of uranium was adsorbed on the adsorption bed, this provides a loading capacity of 12 mg of uranium per kg of dry lignite for the solution used. When sea water with a natural uranium content of $3 \times 10^{-6}$ g of uranium per liter is used, there results a loading capacity of 3 mg of uranium per kg of dry lignite.

Although the process of the invention has been described with reference to particular illustrative examples, it is evident that modifications and variations can be made within the inventive concept.

We claim:

1. A process for recovery of uranium naturally occurring in solution in sea water by concentrative adsorption, comprising the steps of:

bringing sea water which is substantially unmodified as to composition and pH into contact with an adsorbent-holding matrix consisting of granulated lignite until a quantity of uranium is adsorbed which is substantially the maximum adsorbable amount thereof;

then removing said matrix from the sea water and burning said matrix for its heating value and thereby also concentrating the uranium in the combustion residue; and treating said residue to recover the uranium from the residue in the form of its salts.

2. A method as defined in claim 1 in which said adsorbent-holding matrix is composed of grains having an average diameter ranging between 0.5 and 2 mm and in which said matrix is exposed to a flow of sea water for a period sufficient for loading the matrix to a content of uranium substantially equal to 3 mg per kg of dry lignite, said adsorber matrix being so disposed that the contact period therewith lies in the region between one and sixty seconds.

* * * * *